United States Patent [19]

Tanabe et al.

[11] Patent Number: 4,668,963
[45] Date of Patent: May 26, 1987

[54] PEN RECORDER

[75] Inventors: Minoru Tanabe, Daito; Masatoshi Hirota, Hirakata, both of Japan

[73] Assignee: Matsushita Electric Industrial Co., Ltd., Kadoma, Japan

[21] Appl. No.: 888,288

[22] Filed: Jul. 24, 1986

Related U.S. Application Data

[63] Continuation of Ser. No. 672,387, Nov. 16, 1984, abandoned.

[30] Foreign Application Priority Data

Dec. 29, 1983 [JP] Japan ............................. 58-251345
Dec. 29, 1983 [JP] Japan ............................. 58-251347
Jan. 6, 1984 [JP] Japan ................................. 59-996

[51] Int. Cl.$^4$ .................. G01D 15/16; B43L 13/00; E41J 3/04
[52] U.S. Cl. ............................. 346/139 C; 33/18.1; 33/18.2; 346/33 R; 346/139 B; 364/519; 400/17; 400/18; 400/64; 400/279
[58] Field of Search ............. 346/33 R, 139 B, 139 C; 33/18 B, 18 R; 400/17.18, 64, 279; 364/579

[56] References Cited

U.S. PATENT DOCUMENTS

4,150,902 4/1979 Brescia ............................. 400/17 X
4,394,693 7/1983 Shirley ............................. 358/298
4,467,525 8/1984 Logan et al. ..................... 33/18 B
4,500,216 2/1985 Demonte et al. ................. 400/8 X Primary Examiner—E. A. Goldberg
Assistant Examiner—Gerald E. Preston
Attorney, Agent, or Firm—Wenderoth, Lind & Ponack

[57] ABSTRACT

A pen recorder for writing characters and graphic patterns with recording pens on a sheet of recording paper by moving the recording pens in an X-axis direction and moving the sheet of recording paper in a Y-axis direction. When a desired key on a keyboard is depressed, the recording pens and the sheet of recording paper are moved to write a character corresponding to the depressed key on the sheet of recording paper. The size of the character can relatively freely be selected by operation switches for selecting horizontal and vertical character sizes. The pen recorder is automatically controlled for the same operability when the character size is changed in any of horizontal and vertical directions. Where the character size is changed horizontally, an alarm is issued prior to the completion of recording in a recording position a prescribed number of characters prior to a preset right margin. Where the character size is changed vertically, a line spacing commensurate with the changed character size is produced in one line feed operation. Bold characters can freely be produced by recording one character twice in slightly shifted positions.

2 Claims, 27 Drawing Figures

PEN RECORDER

This application is a continuation, of now abandoned application Ser. No. 672,387 filed Nov. 16, 1984 (now abandoned).

BACKGROUND OF THE INVENTION

The present invention relates to a pen recorder in which a recording pen and a sheet of recording paper are moved respectively in X-axis and Y-axis directions for recording characters and graphic patterns on the recording paper, and more particularly to a pen recorder capable of relatively freely changing horizontal and vertical sizes of characters, for example, to be recorded and also of engendering bold characters by typing one character twice in slightly shifted positions.

There have been typewriters used as devices for recording characters. Conventional typewriters, whether electronic, electric, or manual, are however ordinarily capable of printing characters of one size only. Therefore, the typewriters have been incapable of enlarging characters in captions for reader's attention, or enlarging all characters dependent on sentences to be typed or the number of characters to be typed on one sheet.

Word processors have been developed as means for eliminating the above shortcomings. The word processor normally includes a dot-matrix printer which can change characters usually between large and small sizes within the frame of dot matrices. However, there has still been a limitation on the size of characters that can be printed by the dot-matrix printer of the word processor.

SUMMARY OF THE INVENTION

It is an object of the present invention to provide a pen recorder capable of relatively freely changing the size, horizontally or vertically, of characters to be recorded.

Another object of the present invention is to provide a pen recorder which is automatically controlled for the same operability regardless of whether the character size is changed horizontally or vertically. Where the character size is changed horizontally, an alarm is issued prior to the completion of recording in a recording position a prescribed number of characters prior to a preset right margin. Where the character size is changed vertically, a line spacing commensurate with the changed character size is produced in one line feed operation.

Still another object of the present invention is to provide a pen recorder capable of relatively freely producing bold characters by recording one character twice in slightly shifted positions.

These and other objects are accomplished by a pen recorder comprising recording means having a recording pen, first moving means for moving the recording pen in an X-axis direction, a sheet of recording paper, and second moving means for moving the sheet in a Y-axis direction, control means for controlling the recording means, a keyboard for applying operation commands to the control means, first size selecting means for changing the horizontal size of characters to be recorded, and second size selecting means for changing the vertical size of characters to be recorded, the control means being responsive to selection made by the first size selecting means for controlling the interval of movement of the recording pen moved by the first moving means and also responsive to selection made by the second size selecting means for controlling the interval of movement of the sheet moved by the second moving means.

The first moving means includes a timing rope holding the recording pen and a motor for feeding the timing rope. The second moving means includes a platen, pinch rollers for pressing the sheet of recording paper against the platen, and a motor for rotating the platen. The control means includes a microcomputer.

According to one specific aspect of the present invention, a pen recorder comprises at least a selecting switch for selecting a horizontal size of characters to be recorded, recording means for recording the characters, a keyboard having a right margin setting key for determining a recording range, and control means for processing inputs from the keyboard, controlling the recording means, and generating an alarm when a recording pen reaches a position a prescribed number of characters prior to a preset right margin, the arrangement being such that characters can be recorded at the right margin until they are recorded up to the rightmost end where characters of smallest size are recorded, irrespectively of the horizontal size of the characters, and the alarm is generated when the number of characters recordable up to the right margin reaches a preset value.

According to another specific aspect, a pen recorder comprises at least a size selecting switch for selecting a vertical size of characters to be recorded, a line spacing selecting switch for selecting a line spacing at the time of starting a new line, recording means for recording characters of the vertical size selected by the size selecting switch, a keyboard for entering characters to be recorded, and control means for processing inputs from the keyboard and controlling the recording means, the control means controlling the recording means to record characters with the line spacing commensurate with values set by the size selecting switch and the line spacing selecting switch.

According to still another specific aspect, the control means is arranged to move a character writing starting point at a first pitch corresponding to the size of one character each time one character is recorded, and also to move the starting point in at least one of X- and Y-axis directions at a second pitch smaller than the first pitch for recording the same characters.

The pen recorder according to the present invention has the following advantages:

(1) The size, horizontal and vertical, of characters to be recorded can be varied relatively easily.

(2) The pen recorder is automatically controlled for the same operability even when the size of characters is varied in any of horizontal and vertical directions. Where the character size is changed horizontally, a warning is issued prior to the completion of recording at a recording position a prescribed number of characters prior to a preset right margin. Therefore, the number of character recordable after the warning has been generated remains constant irrespectively of the character size. Where the character size is changed vertically, a line spacing commensurate with the changed character size is produced in one line feed operation.

(3) Bold characters can relatively freely be produced by recording one character twice in slightly shifted positions.

While the novel features of the invention are set forth particularly in the appended claims, the invention, both as to organization and content, will be better understood and appreciated, along with other objects and features thereof, from the following detailed description in conjunction with the drawings.

DESCRIPTION OF THE PREFERRED EMBODIMENT

Figure 1:
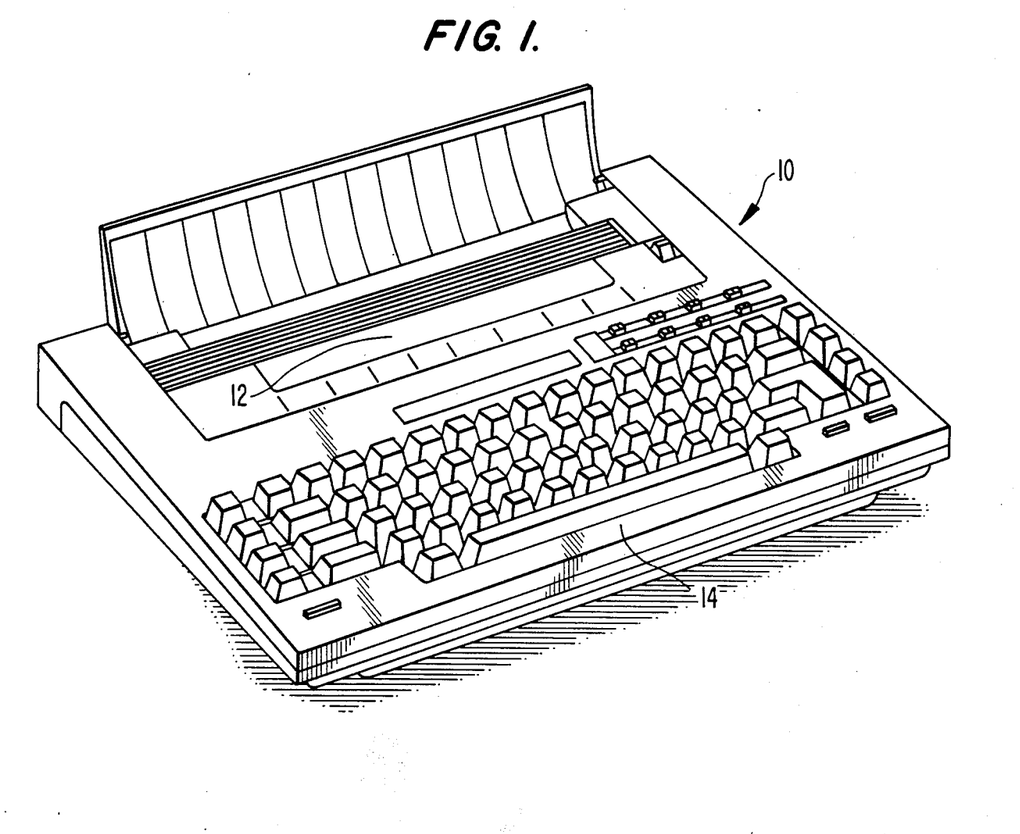
FIG. 1 is a perspective view of a pen recorder according to an embodiment of the present invention.

FIG. 1 shows a pen recorder according to the present invention, the pen recorder having a keyboard 14 and a recording mechanism 12.

Figure 2:
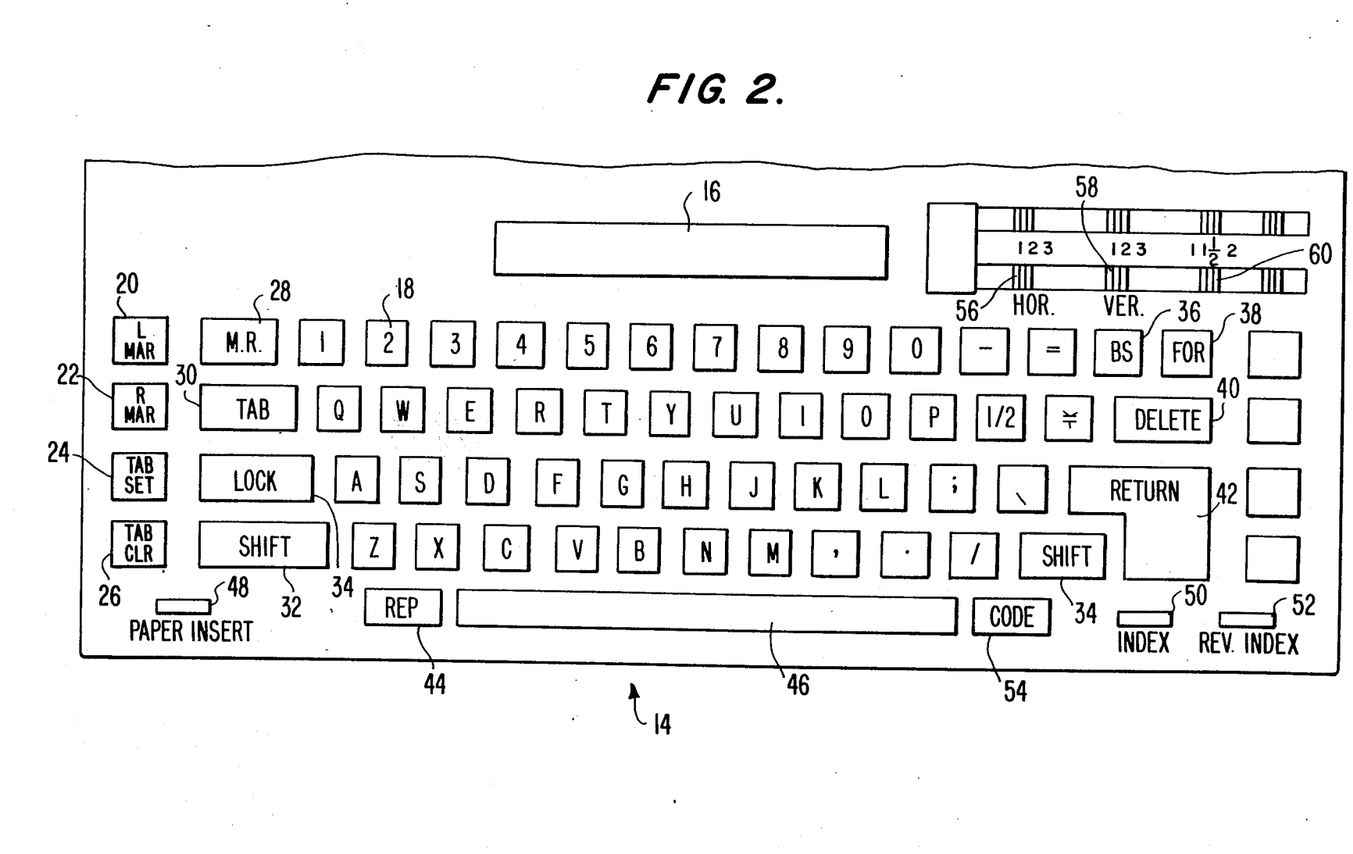
FIG. 2 is a plan view of a keyboard of the pen recorder.
Figure 3:
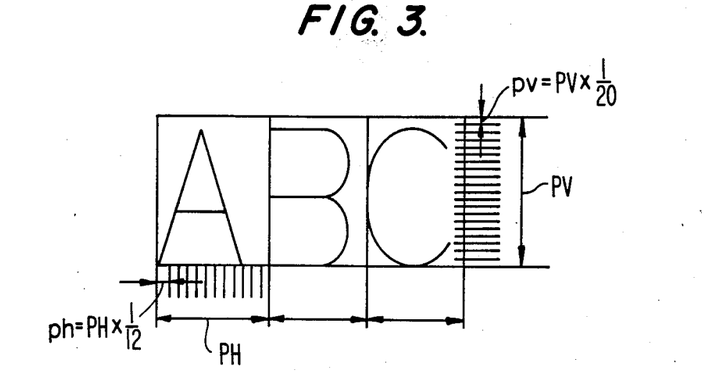
FIG. 3 is a diagram showing the size of characters recorded by the pen recorder.

As illustrated in FIG. 2, the keyboard 14 has a plurality of operation keys, a plurality of control switches, and a display 16. The operation keys include forty-five character keys 18 representing letters, numerals, and symbols to be typed on a sheet of recording paper, and a plurality of control keys for controlling recording operation of the pen recorder. The control keys include a left margin setting key 20, a right margin setting key 22, a tabulator stop setting key 24, a tabulator stop clearing key 26, a margin release key 28, a tabulator stop key 30, a shift lock key 32, a shift key 34, a back space key 36, a forward key 38, a delete key 40, a return key 42, a repeat key 44, and a space key 46. These keys are the same in function as the control keys on conventional electronic typewriters, and will not be described. The control keys also include a paper insert key 48 for setting a sheet of recording paper in the recorder mechanism 12, an index key 50 for feeding the sheet, in one depression, by an interval equal to half of the vertical length of characters being typed, a reverse index key 52 for returning the sheet, in one depression, by an interval equal to half of the vertical length of characters being typed, and a code key 54 for changing recording operation as required by the depression of the index key 50, the reverse index key 52, the back space key 36, and the forward key 38. The code key 54 is also called a second shift key. When either of the index key 50, the reverse index key 52, the back space key 36, and the forward key 38 is depressed while the code key 54 is being depressed, the function represented by the depressed control key is changed. For example, when the index key 50 is depressed while the code key 54 is being depressed, the sheet is fed by 1/20 of the vertical length of a character of a basic size. When the back space key 36 is depressed while the code key 54 is being depressed, a recording head is moved back by 1/12 of the horizontal length of a character of a basic size. These modes of operation will be described later in detail. As shown in FIG. 3, the character of the basic size is so sized as to be accommodated in a rectangular shape having a vertical length PV and a horizontal length PH, the vertical length PV being divided into 20 pitch units pv and the horizontal length PH being divided into 12 pitch units ph. When the code key 54 is not depressed, the sheet or the recording head is fed by increments of PV, PH, or increments twice or three times PV, PH. When the code key 54 is depressed, the sheet or the recording head is fed by increments of pv, ph. The keyboard 14 also includes as control keys horizontal and vertical character size selecting switches 56, 58 for changing the horizontal length PH and the vertical length PV, respectively, of a character to be recorded between the basic size, a size twice the basic size, and a size three times the basic size, and a line spacing selecting switch 60 for chaning the line spacing between a single space, one and a half spaces, and double spaces.

Figure 4:
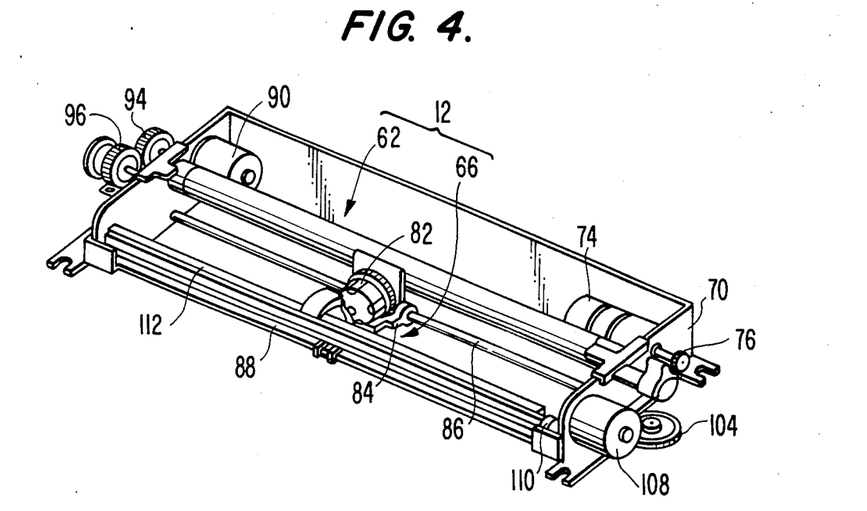
FIG. 4 is a perspective view of a recording mechanism in the pen recorder.
Figure 5:
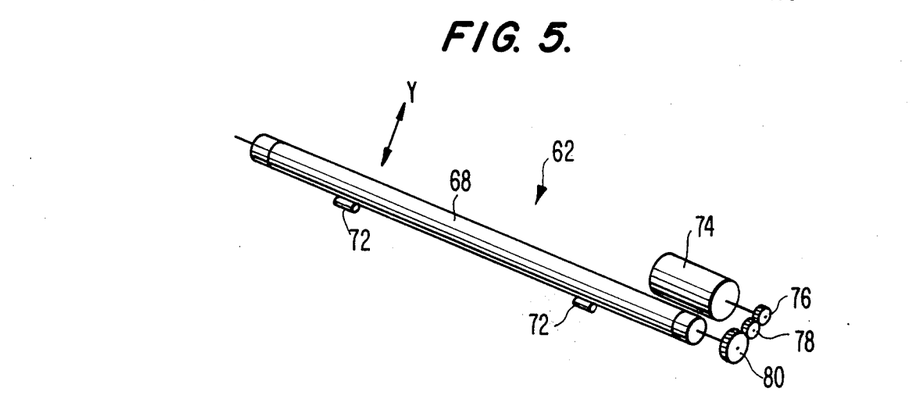
FIG. 5 is a perspective view of a sheet feeder in the recording mechanism.
Figure 6:
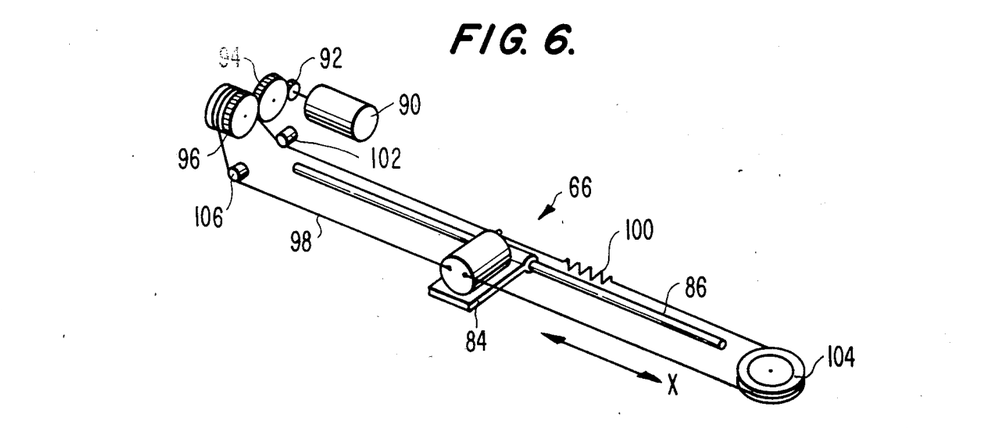
FIG. 6 is a perspective view of a head feeder in the recording mechanism.

The recording mechanism 12 will be described with reference to FIGS. 4 through 6. The recording mechanism 12 is essentially composed of a sheet feeder 62 for moving a sheet of recording paper in a Y-axis direction, and a head feeder 66 for moving a recording head 84 in an X-axis direction. Characters and graphic patterns are recorded on the sheet by combining movement of the sheet in the Y-axis direction and movement of the recording head in the X-axis direction. First, the sheet feeder 62 will be described. The sheet feeder 62 includes a platen 68 rotatably mounted at its opposite ends on a frame 70. A plurality of pinch rollers 72 are pressed against the platen 68 with a sheet of recording paper being sandwitched between the pinch rollers 72 and the platen 68. The sheet can therefore be fed along by rotating the platen 68. The platen 68 is rotated by a reversible motor 74 having a rotatable shaft operatively coupled through a train of gears 76, 78, 80 to the shaft of the platen 68.

The head feeder 66 includes a recording head 84 having a plurality of recording pens 82 such as ball-point pens and movable in the X-axis direction along a guide shaft 86 and a guide plate 88 supported at their opposite ends on the frame 70. The recording head 84 is driven by a reversible motor 90. More specifically, rotative power from the motor 90 is transmitted through gears 92, 94 to a gear 96 having a pulley to rotate the gear 96. A timing feed rope 98 is trained around the pulley of the gear 96 and has opposite ends secured to the recording head 84. The feed rope 98 includes a spring 100 for taking up any slack in the feed rope 98. The feed rope 98 is also trained around pulleys 102, 104, 106. When the motor 90 is energized, the gear 96 is rotated to feed the rope 98 for thereby moving the recording head 84 in the X-axis direction.

The pen recorder also includes a pen up/down mechanism for bringing the recording pens 82 on the recording head 84 into and out of contact with the sheet. More specifically, the recording pens 82 are normally spring-biased in a direction away from the sheet. When a motor 108 is energized to actuate a cam mechanism 110 and a presser plate 112, the recording pens 82 are pressed against the sheet.

Figure 7:
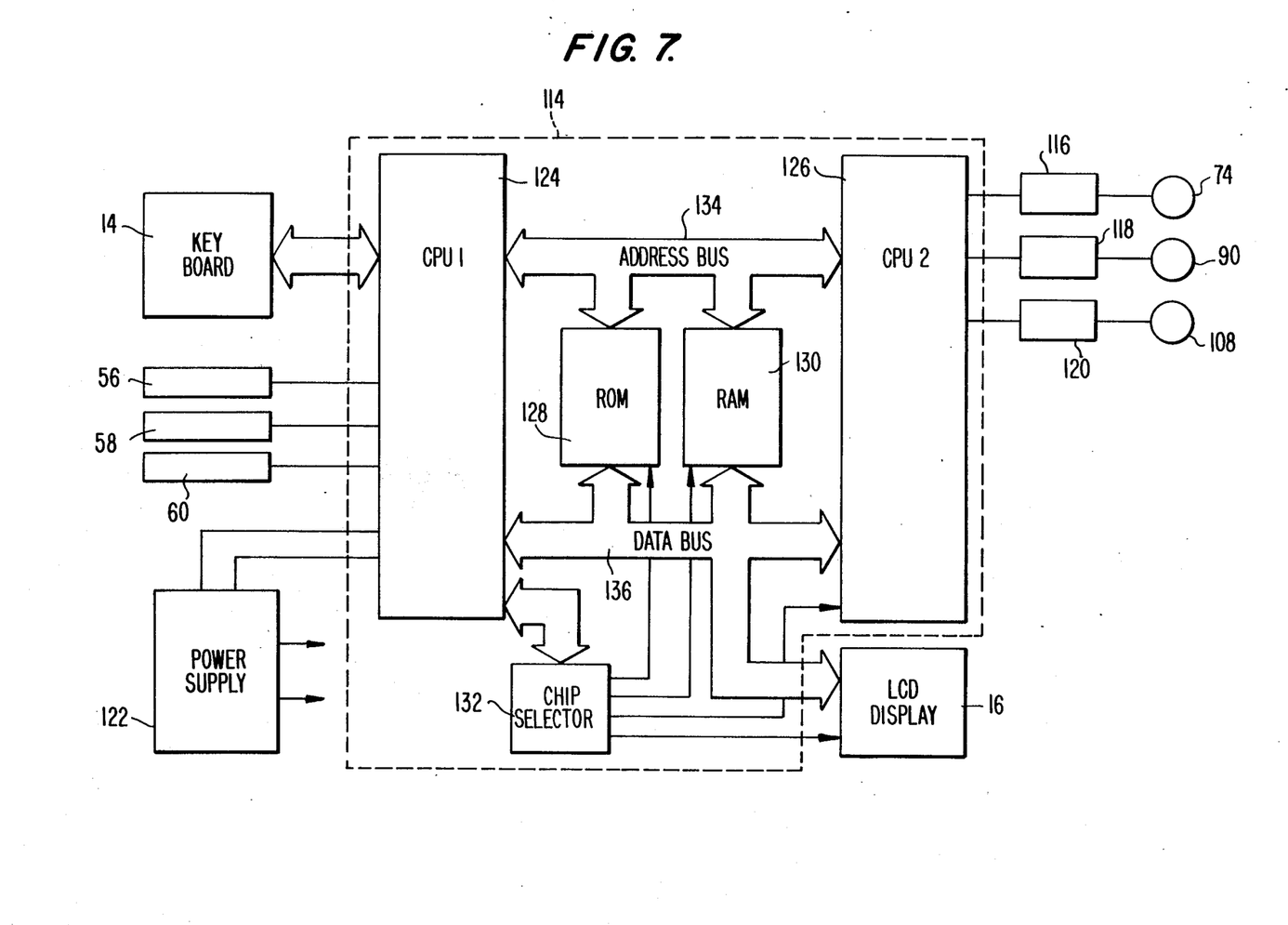
FIG. 7 is a block diagram of an electronic control circuit for the pen recorder.

FIG. 7 is schematically illustrative of a circuit arrangement for controlling the pen recorder of the present invention. The circuit arrangement includes, as a main component, a microcomputer 114 having input terminals connected to the keyboard 14 and the selecting switches 56, 58, 60 and output terminals connected to the motors 74, 90, 108 through their drivers 116, 118, 120, and a liquid crystal display 16. The microcomputer 114 is powered by a power supply 122. The microcomputer 114 may be of any design provided it enables the pen recorder to perform prescribed modes of operation as described later on. In the illustrated embodiment, the microcomputer 114 is of the following construction: The microcomputer 114 comprises a first CPU 124 (HD6303X manufactured by Hitachi Ltd.), a second CPU 126 (HD6301V manufactured by Hitachi Ltd.), a 16K-byte ROM 128, a 4K-byte RAM 130, a chip selector 132 for selecting the chips of the CPUs 124, 126, the ROM 128, and the RAM 130, an address bus 134, and a data bus 136. The second CPU 126 contains a 4K-byte ROM and 192-byte RAM. The first CPU 124 is capable of issuing command in response to input signals from the keyboard 14 or the like, and the second CPU 126 is capable of driving the motors in response to the command signals from the first CPU 124.

Operation of the pen recorder of the foregoing construction will be described. The pen recorder can change the horizontal and vertical sizes of characters to be recorded. When the horizontal character size selecting switch 56 is set to the basic-size position and the pen recorder is operated to record a character, the horizontal length of the recorded character is equal to the prescribed basic length PH. When the selecting switch 56 is set to the double-size or triple-size position, the horizontal length of the recorded character is equal to the length twice or three times the basic length PH. Likewise, when the vertical character size selecting switch 58 is set to the basic-size position and the pen recorder is operated to record a character, the vertical length of the recorded character is equal to the prescribed basic length PV. When the selecting switch 58 is set to the double-size or triple-size position, the vertical length of the recorded character is equal to the length twice or three times the basic length PV. By selecting positions of the two selecting switches 56, 58, the character size and shape can relatively freely be changed to produce smaller characters, larger characters, horizontally elongate characters, and vertically elongate characters.

Figure 8:
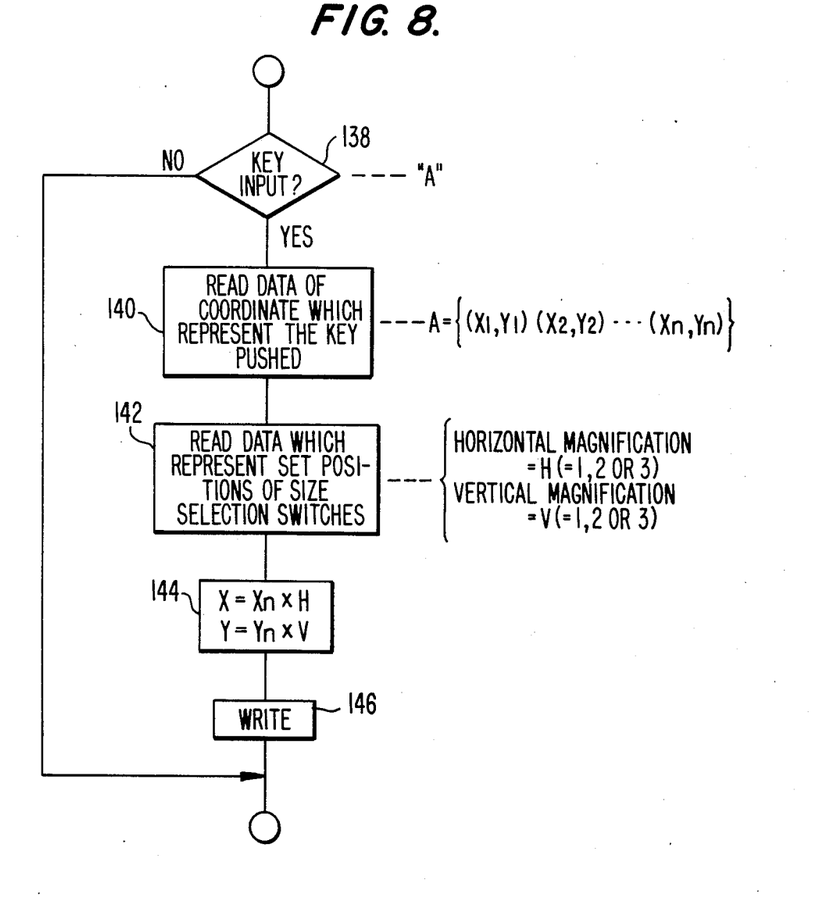
FIG. 8 is a flowchart of steps of character size selecting operation of the pen recorder.

The above mode of size changing operation will be described with reference to the flowchart of FIG. 8. When a character key, for example, a letter key representing "A", on the keyboard 14 is depressed, the microcomputer 14 executes a process as illustrated in the flowchart of FIG. 8. More specifically, a step 138 checks if there is a key input, and if there is, then the program goes to a step 140 which reads the coordinates data of the character to be written which are stored in the microcomputer 114. Since the letter "A" is to be written, positional data on X and Y coordinates of dots required to type "A" are read out. Then, the microcomputer reads, in a step 142, data indicative of the set positions of the horizontal and vertical character size selecting switches 56, 58, that is, data indicating whether the letter is to be recorded in the basic size, double size, or triple size, or stated otherwise horizontal and vertical magnifications H, V for the letter. In a next step 144, the read magnifications H, V are multiplied by the coordinate data of the letter to produce final coordinate data. In a step 146, the microcomputer 114 controls the motors 74, 90, 108 for recording the desired letter on the recording sheet. Therefore, the desired letter is written on the recording sheet through a combination of the feeding of the sheet, the movement of the recording head 84, and the up-and-down movement of the recording pens 82 on the recording head 84 based on the coordinate data determined in the step 144.

If the step 138 determines that there is no character key input from the keyboard 14, then no operation is executed in the steps 140 through 146.

When a line feed operation is to be effected, the pen recorder carries out such a line feed operation dependent on the size of characters now in use, particularly the vertical length thereof. Where the line spacing selecting switch 60 is set to the single-space position, and if the interval of feed of the sheet corresponding to the single space were constant at all times regardless of the character size, then printed characters would vertically be superimposed. To avoid this problem, the interval of feed of the sheet corresponding to single line spacing, for example, is varied dependent on the character size to prevent printed characters from being superimposed and provide line spacing commensurate with the selected character size.

Figure 9:
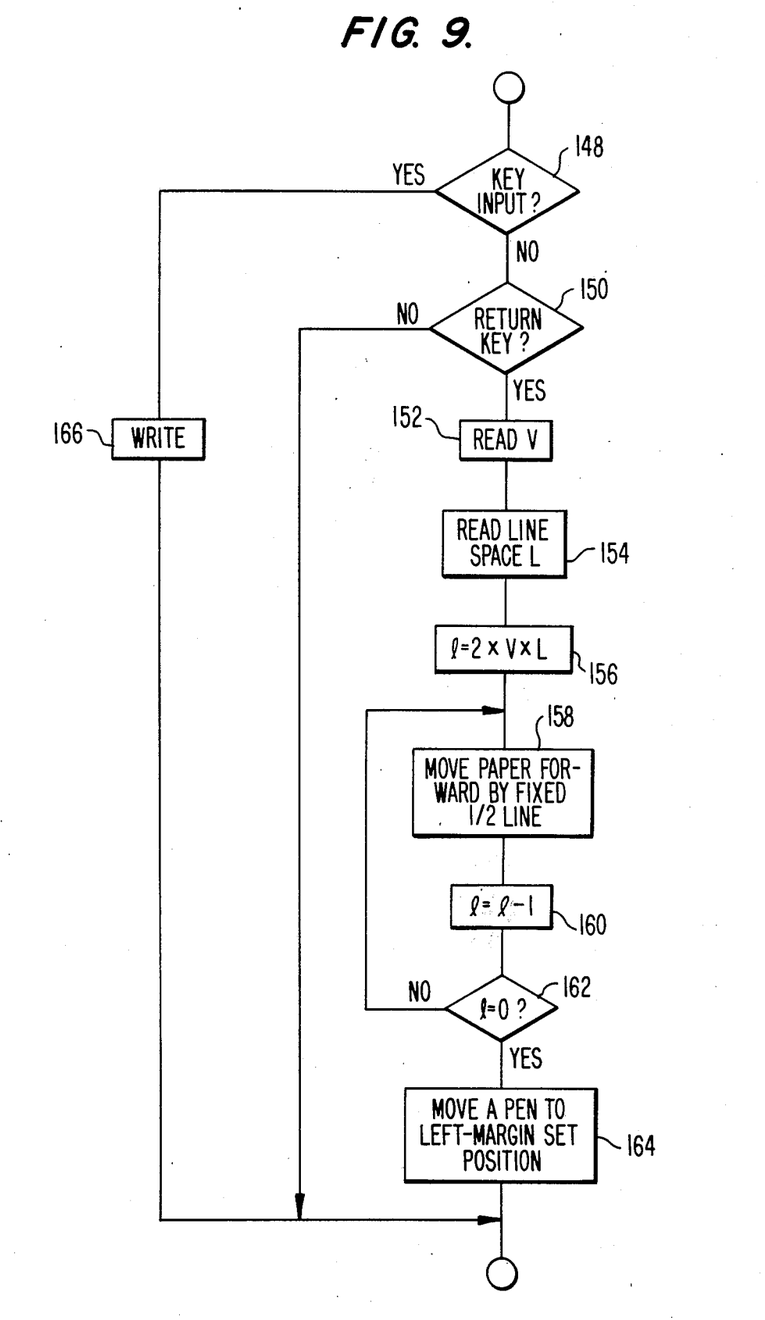
FIG. 9 is a flowchart of steps of line feed operation of the pen recorder.

Automatic operation for changing the line spacing will be described with reference to the flowchart of FIG. 9. When the return key 42 is depressed after one line has been written on the sheet, a step 148 determines whether there is a key input or not, and if not, then a step 150 ascertains whether a line feed operation is effected, that is, the return key 42 is depressed. If the return key 42 is depressed, then a step 152 reads out the set value of the vertical character size selecting switch 58, that is, the selected chararacter magnification V. Then, a step 154 reads the set value of the line spacing selecting switch 60, that is, the selected line spacing L. Thereafter, a step 156 effects an arithmetic operation of $2 \times V \times L$, and stores the result as l. When l is 1, the sheet feeder is instructed to feed the sheet by an interval equal to a ½ line spacing. The interval equal to the ½ line spacing is equivalent to half of one line in the event that the horizontal and vertical magnifications of a character to be written are 1, that is, the character is of the basic size. This interval is of a fixed absolute value, but not a variable which changes dependent on the character size. After the value l has been calculated, the recording mechanism 12 is driven in a step 158 to feed the sheet by the ½ line spacing. Then, a step 160 effects an arithmetic operation of $1-1$, and a step 162 checks if a new value l obtained as a result of the arithmetic operation in the step 160 is 0 or not. If not 0, then the program returns to the step 158 to feed the sheet by the ½ line spacing. This loop is repeated until the new value l becomes 0. When l becomes 0, then the program proceeds to a step 164 in which the recording head 84 until the recording pen 82 reach a preset left margin in preparation for the writing of a next character. If there is a key input in the step 148, a character is written in a step 166. If the step 150 determines that the return key 42 has not been depressed, no operation is carried out in the steps 152 through 164.

Figure 10:
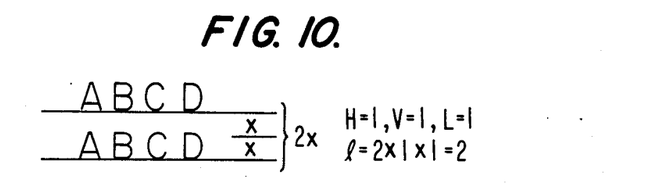
FIGS. 10 through 13 are diagrams showing the relationships between character sizes and line spacings.
Figure 11:
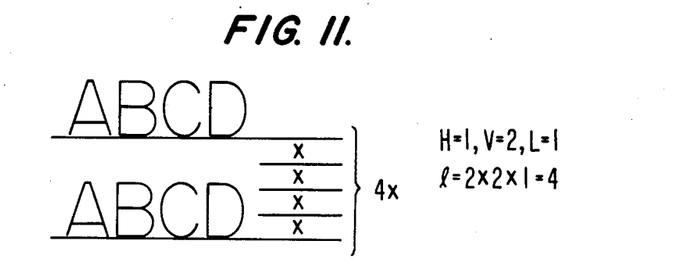

The line feed operation will be described with reference to examples of recorded characters as shown in FIGS. 10 through 13. Designated at x is an interval of feed of the sheet which is equivalent to the fixed ½ line spacing, that is, an interval of feed of the sheet in the event of l=1. FIG. 10 shows an example in which characters are written with the horizontal character magnification H being 1, the vertical character magnification V being 1, and the line spacing L being 1. Since l=2 in the step 156 in FIG. 9, the interval between first and second lines is 2x, that is, a length equal to the vertical length of basic-size characters, or a length equal to one line of basic-size characters. FIG. 11 shows an example of characters in which H is 1, V is 2, and L is 1. Since l=4, the interval between first and second lines is 4x, that is, a length equal to the vertical length of enlarged characters which is twice that of the basic-size characters, or a length equal to one line of such enlarged characters. Thus, even if the vertical character length is varied with the line spacing selecting switch 60 is set to the single-space position, the interval corresponding to one line spacing is automatically changed dependent on the character size selected, so that characters on the first and second lines will not be superimposed.

Figure 12:
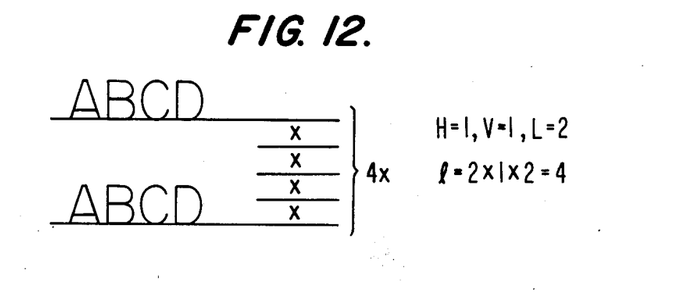
Figure 13:
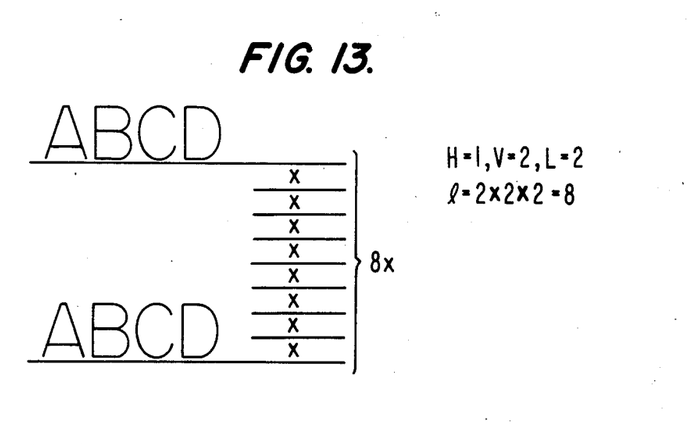

FIG. 12 is illustrative of an example of printed characters in which H is 1, V is 1, and L is 2. Since l=4, the interval between first and second lines is 4x, that is, a length equal to twice the vertical length of basic-size characters, or a lenth equal to two lines of basic-size characters. FIG. 13 shows an example of characters in which H is 1, V is 2, and L is 2. Since l=8, the interval between first and second lines is 8x, that is, a length equal to twice the vertical length of enlarged characters which is twice that of the basic-size characters. Therefore, the line spacing selected by the line spacing selecting switch 60 is varied dependent on the character size changed, and hence corresponds to characters of the size being selected.

The pen recorder can issue a warning when the recording head reaches a certain position prior to a preset right margin. A region between the certain position and the preset right margin is called a hot zone. When the recording head enters the hot zone, an alarm is generated to let the operator known that the recording head approaches the terminal end of one line. According to the embodiment of the invention, the operator is warned about the hot zone at different physical positions dependent on the character size. The alarm is issued when the number of characters that can be written up to the preset right margin reaches a prescribed number. With this arrangement, the number of characters that can be written after the alarm has been issued and before the preset right margin is reached remains constant (say, six) independently of the selected character size. Therefore, the operator can known how many characters can be entered before reaching the preset right margin immediately when the alarm is produced.

Margin setting operation and hot zone warning operation will be described with reference to the flowchart of FIG. 14.

The return key 42 and the space key 46 are depressed to move the recording head 84 to a desired position. When the recording head 84 has reached a position which the operator wishes to set as a left margin, the left margin setting key 20 is depressed. Then, the program goes from a step 168 to a step 170 in which the present pen position is stored as the left margin in the microcomputer 114. Then, the recording head 84 is moved again to a position which the operator wishes to set as a right margin, and the right margin setting key 22 is depressed. The program then proceeds from the step 168 through the step 170 to a step 174 in which the present pen position is stored as the right margin in the microcomputer 114.

Figure 14:
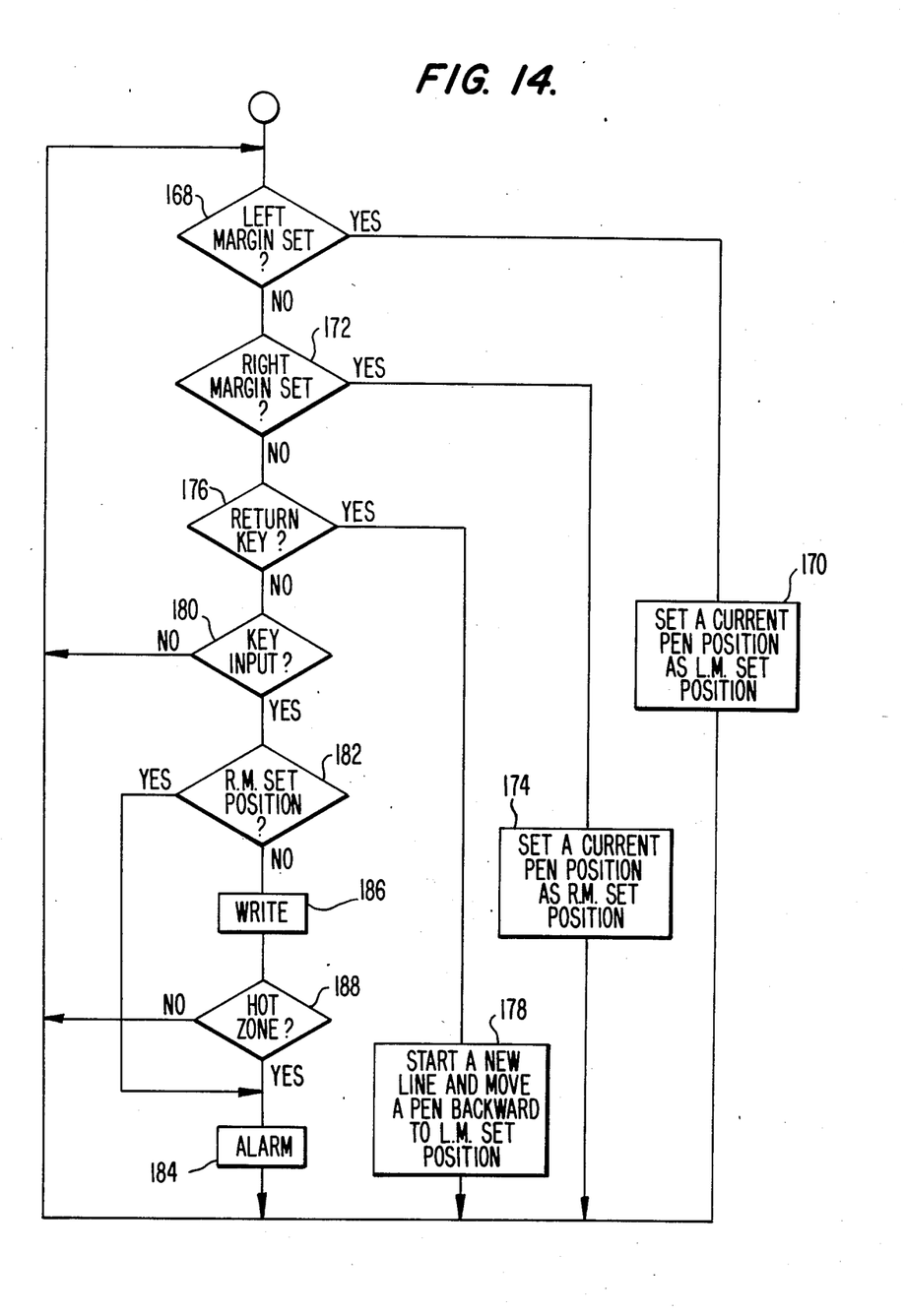
FIG. 14 is a flowchart of steps of margin setting and hot zone warning operation.

Although no relationship between the left and right margins is illustrated in FIG. 14, the left and right margins cannot be set in the same position, the right margin cannot be set leftward of the left margin, and the left margin cannot be set rightward of the right margin.

If a carriage return input is detected in a step 176, then a step 178 starts a new line and move the pens back to the left margin. If no character key input is detected in a step 180, then the program returns to START. If there is a character key input, then a step 182 determines whether the pen position has reached the preset right margin. If the pens have reached the right margin, then no character is written, an alarm is issued in a step 184, and the program returns to START. If the pens have not reached the right margin, then a character is written in a step 186 in a size selected by the character size selecting switches 56, 58. After the character has been written, a step 188 ascertains whether characters of the present size can be printed by the preset number up to the preset right margin, that is, whether the recording head has reached the hot zone or not. If the hot zone is detected, the step 184 issues an alarm. Determination of the hot zone will be described in detail later on.

Figure 15:
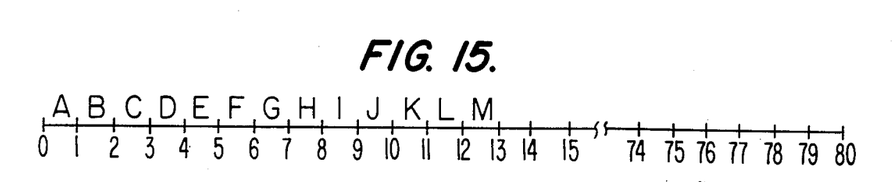
FIGS. 15 through 19 are diagrams explanatory of the margin setting and hot zone warning operation.
Figure 16:
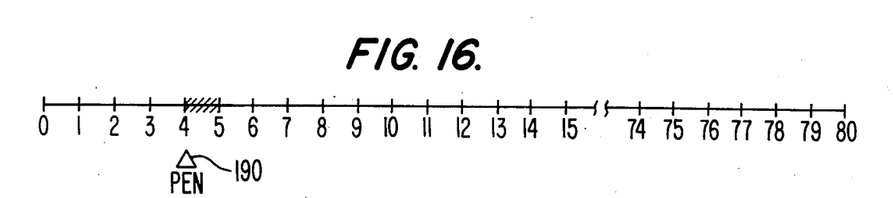
Figure 17:
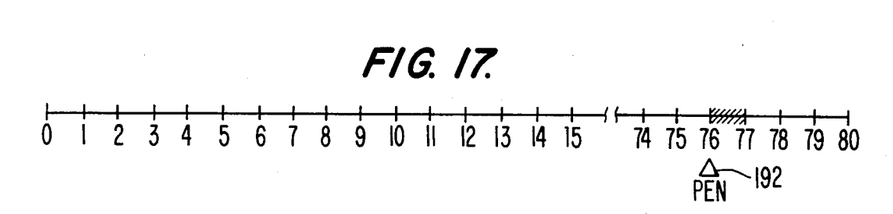

Actual margin setting will be described with reference to FIGS. 15 through 17. FIG. 15 shows a horizontal width across which characters can be written in the X-axis direction. In case the horizontal character size magnification is 1, eighty characters can be printed. FIGS. 16 and 17 are illustrative of left and right margins, respectively, which have been set. The recording mechanism of the present invention is arranged such that the pen will stop successively on pitch lines marked with 1 through 80 as characters are typed respectively. When the left margin setting key 20 is depressed at the time the pen is, located in a position 190 in FIG. 16, the fourth pitch is set as the left margin. When the right margin setting key 22 is depressed at the time the pen is located in a position 192 in FIG. 17, the right margin is set between 76th and 77th pitches.

Figure 18:
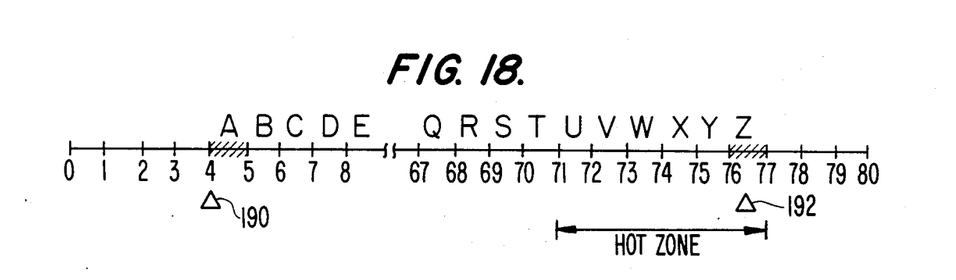

FIGS. 18 and 19 illustrate examples of characters printed after the left and right margines 190, 192 have been set. In FIG. 18, the horizontal and vertical magnifications are 1, and characters are printed until a character is positioned on the right margin. No further characters are printed since the pen enter the right margin position after the character "Z" has been written in FIG. 18. Since six characters can be written after the hot zone alarm has been issued, the alarm for a hot zone is issued after the character "T" has been written in FIG. 18, and thereafter the six characters "U V W X Y Z" can be printed.

Figure 19:
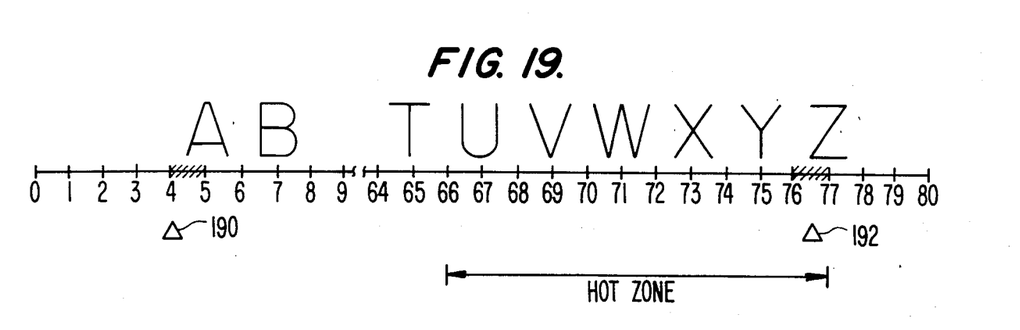

In FIG. 19, the horizontal and vertical magnifications are 2, and no characters are written after the character "Z" has been written, and the alarm for a hot zone is issued after the character "T" has been written. The left and right margins can be temporarily released by the margin release key 28. The hot zone is determined by the microcomputer 114 according to the following formula:

0≦(preset right margin position+horizontal character magnification H)−(present pen position horizontal character magnification H×number of characters that can be entered in hot zone) <horizontal character magnification H The hot zone alarm is given in the position of pens which meet the above formula. For the example of FIG. 18, if present pen position is a "U" writing position or a 71st pitch, then $$0\leq(76+1)-(71+1\times 6)=0<1$$

Since the above formula is met, the hot zone alarm is issued at the 71st pitch.

The pen recorder has the index key 50 and the reverse index key 52. Operation using these keys will be described. The index key 50 is effective in one depression to feed the recording sheet by an interval equal to half of the vertical length of one line of characters being written, and the reverse index key 52 is effective in one depression to reverse the recording sheet by an interval equal to half of the vertical length of one line of characters being written. If the index key 50 is depressed twice while characters are being written, then the sheet can be fed along an interval equal to one line of the characters being written. If the reverse index key 52 is depressed twice after a new line has been started, then the sheet can be reversed an interval equal to one line of the characters being written to bring the pens to the starting end of the previous line. As a consequence, if characters are desired to be written again on a previous line after a line feed operation, then the keys 50, 52 are operated to rewrite the characters on the previous line.

Figure 20:
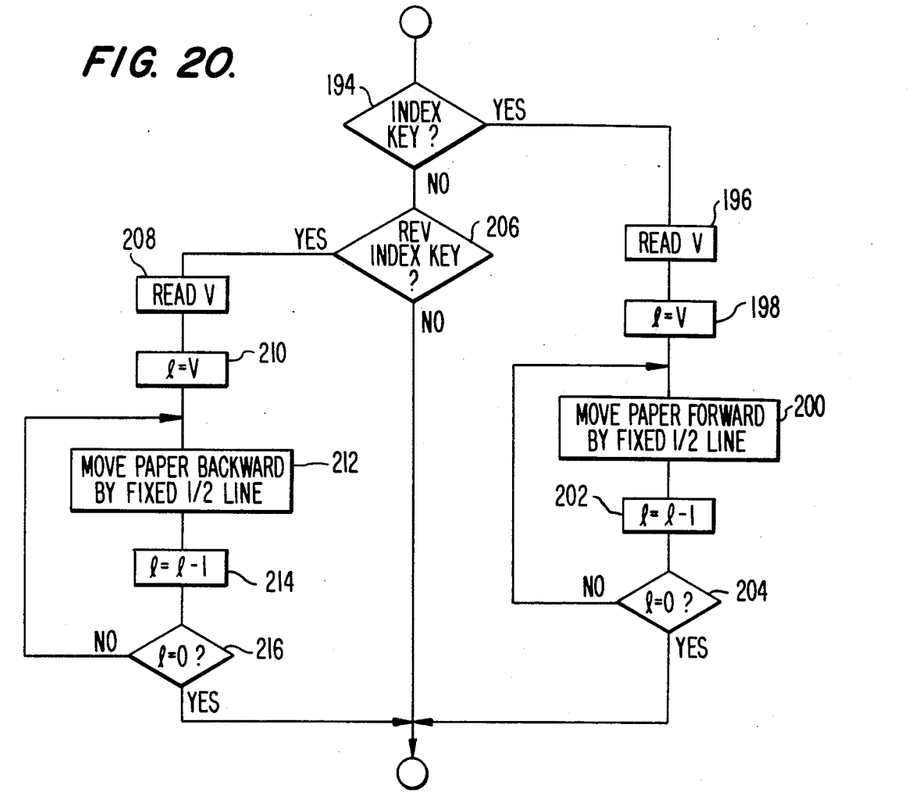
FIG. 20 is a flowchart of steps of indexing and reverse indexing operation.

Operation of these keys 50, 52 will be described with reference to the flowchart of FIG. 20. If a step 194 detects that the index key 50 is depressed, a step 196 reads the set position of the vertical character size selecting switch 58, that is, the selected vertical character magnification V, and then a step 198 stores the magnification V as l. As described above, the value l is to instruct the sheet feeder to feed the sheet by a distance equivalent to ½ line of characters of the basic size. Then, a step 200 feeds the sheet by the fixed ½ line. A step 202 calculates l−1 as with the step 160 in FIG. 9, and stores the result as a new l. A step 204 determines whether the new l is 0 or not. If not 0, then the steps 200, 202, 204 are repeated. If 0, then the feeding of the sheet is completed.

A mode of operation initiated when the reverse index key 52 is depressed is substantially the same as that started by the index key 50 except that the sheet is moved back. More specifically, if a step 206 detects that the reverse index key 52 is depressed, then a step 208 reads out V, and a step 210 stores V as l. A step 212 reverses the sheet by a distance equal to the fixed ½ line, a step 214 calculates l−1, and a step 216 checks whether the new l is 0 or not. The steps 212, 214, 216 are repeated until the new l becomes 0.

When the index key 50 and the reverse index key 52 are depressed while the second shift key or code key 54 is being depressed, the sheet will be fed at different pitches. As illustrated in FIG. 3, a character of the basic size, that is, with the vertical and horizontal magnifications being 1, can be accommodated in a rectangular box having the vertical length PV and the horizontal length PH. The values PV, PH are indicative of a pitch of vertical feed of the sheet and a pitch of horizontal feed of the sheet, respectively, at the time characters of the basic size are recorded. These pitches will be 2PV, 2PH and 3PV, 3PH in case characters of double and triple sizes are to be recorded. When the index key and the reverse index key are depressed once, the sheet is fed by an interval of ½ PV at the time of recording characters of the basic size, by an interval of PV at the time of recording characters of the double size, and by an interval of 3/2 PV at the time of recording characters of the triple size. Stated otherwise, the recording sheet is fed by half of the interval equal to one line of characters being recorded. If the index key or the reverse index key is depressed while depressing the code key 54, then the recording sheet is fed by an interval of 1/20 PV or pv in FIG. 3 irrespectively of the size of characters being recorded. When the back space key 36 is depressed while depressing the code key 54, the recording head is moved by ½ PH or ph in FIG. 3 irrespectively of the size of characters being recorded. When the back space key 36 is depressed while the code key 54 remains undepressed, the recording head is moved by an interval corresponding to one character, that is, an interval of PH at the time of recording characters of the basic horizontal size, an interval of 2×PH at the time of recording characters of the double horizontal size, and an interval of 3×PH at the time of recording characters of the triple horizontal size.

Figure 21:
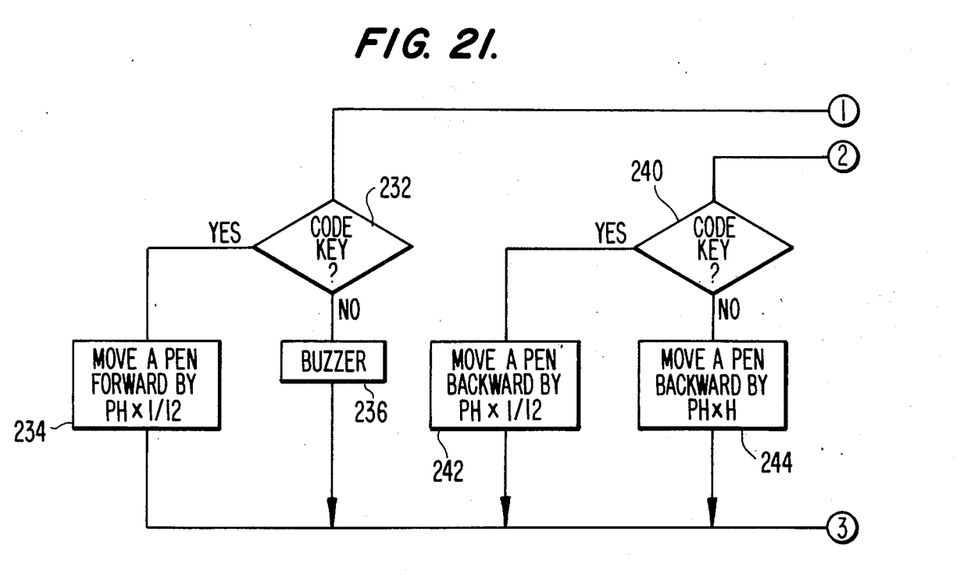
FIGS. 21 through 23 are a flowchart of steps of operation utilizing a code key.

Operation related to the code key 54 will be described with reference to FIGS. 21 through 23. If the depression of the index key 50 is detected in a step 218, the program goes to a step 220 which ascertains whether the code key 54 is depresesed or not. If the code key 54 is depressed, the sheet is fed along in a step 222 by an interval of PV×1/20 (see FIG. 3) regardless of the character size. Therefore, the sheet can be fed along PV by depressing the index key 50 twenty times while depressing the code key 54. If the step 220 determines that the code key 54 is not depressed, the steps 196, 198, 200, 204 in FIG. 20 are executed to feed the sheet along an interval equal to half of one line of characters being recorded.

Figure 22:
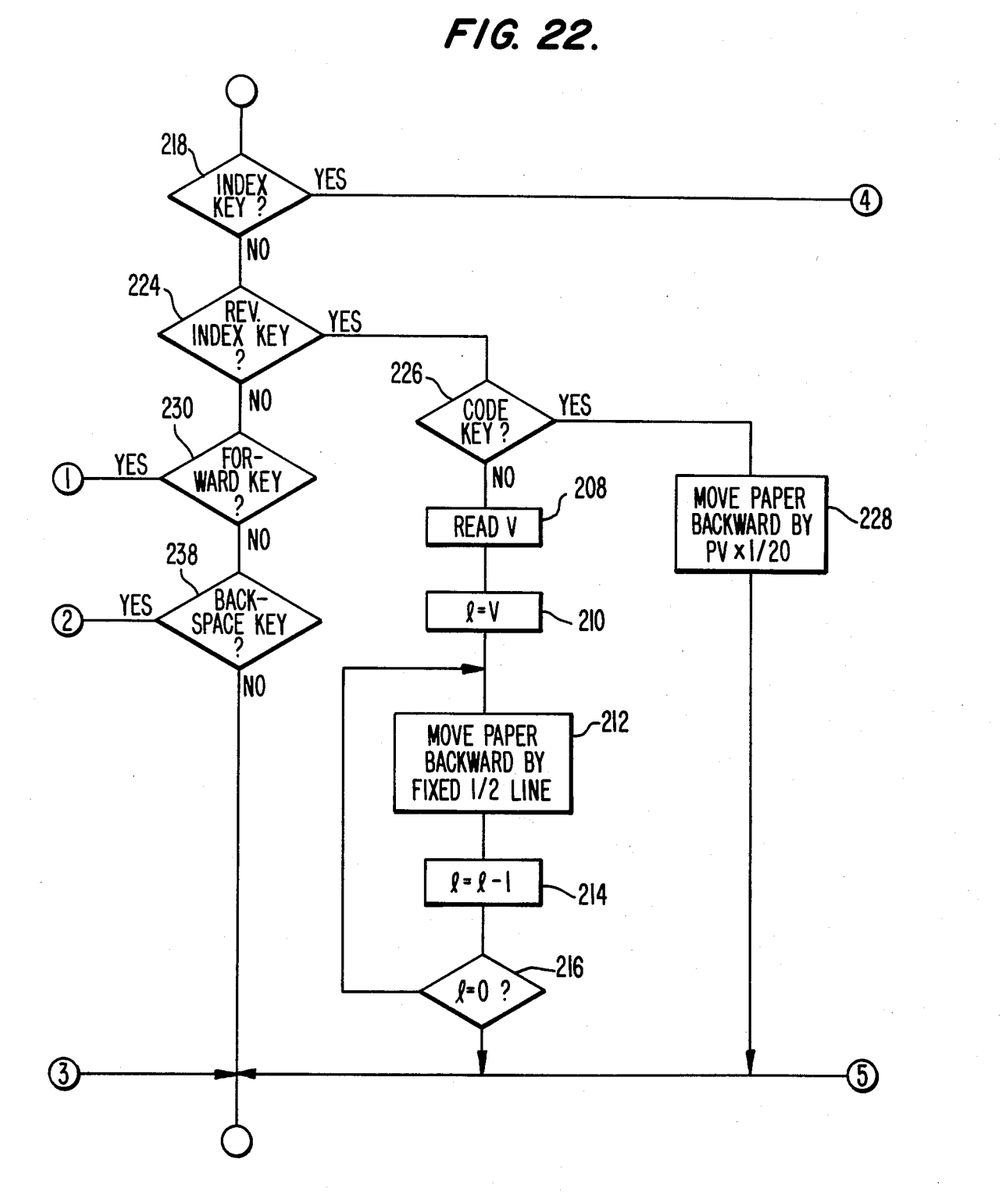

If a step 224 detects when the reverse index key 52, then the program goes to a step 226 which ascertains whether the code key 54 is depresesed or not. If the code key 54 is depressed, the program goes to a step 228 in which the sheet is reversed by an interval of PV×1/20 (see FIG. 3) regardless of the character size. If the step 226 determines that the code key 54 is not depressed, the steps 208, 210, 212, 214, 216 in FIG. 20 are executed to move the sheet back an interval equal to half of one line of characters being recorded.

Figure 23:
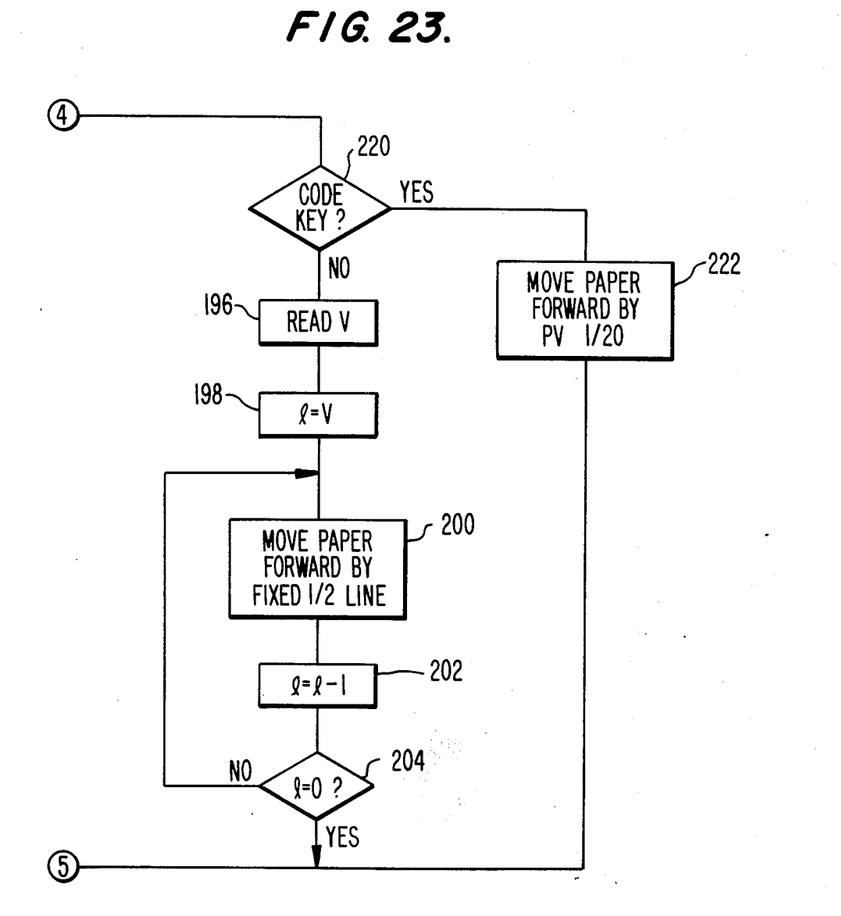

If the forward key 38 is depressed, such depression is detected by a step 230 and then the program proceeds to a step 232. If the step 232 detects that the code key 54 is depressed, the program goes to a step 234 in which the recording head 84 (recording pens 82) is moved forward by an interval of PH×1/12 (see FIG. 3) irrespectively of the size of characters being recorded. Therefore, the recording head 84 can be moved PH by depressing the forward key 38 twelve times while depressing the code key 54. If the step 232 determines that the code key 54 remains undepressed, then the program goes to a step 236 in which a buzzer is energized to issue an alarm. A cursor indicative of the character position on the display 16 moves forward one character each time the forward key 38 is depressed.

If the back space key 36 is depressed, such depression is detected by a step 238 and then the program proceeds to a step 240. If the step 240 detects that the code key 54 is depressed, the program goes to a step 242 in which the recording head 84 (recording pens 82) is moved backward by an interval of PH×1/12 (see FIG. 3) irrespectively of the size of characters being recorded. If the step 240 determines that the code key 54 remains undepressed, then the program goes to a step 244 in which the recording head is moved an interval of PH×H corresponding to one character of characters being recorded each time the back space key 36 is depressed.

Figure 25:
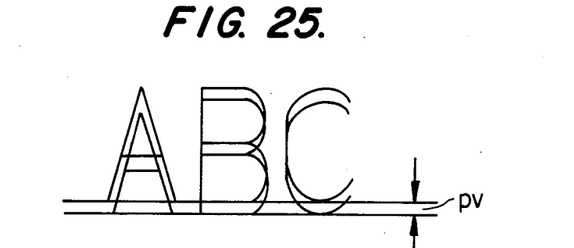
Figure 26:
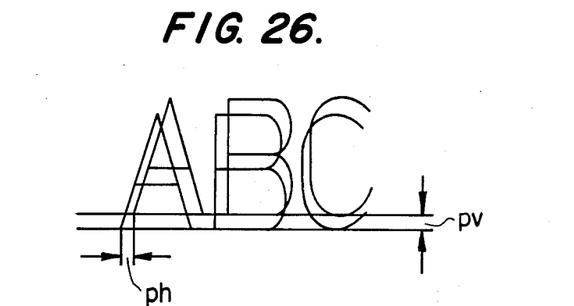

The pen recorder according to the present invention is capable of recording superimposed characters by operating the code key, the index key, the reverse index key, the forward key, and the back space key in combination. The superimposed characters are produced by typing one character twice in slightly shifted positions as shown in FIGS. 24 through 26, and can be used to engender bold characters for titles and indexes.

Figure 24:
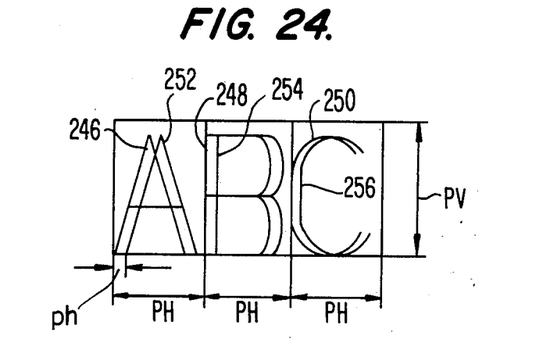
FIGS. 24 through 26 are diagrams showing bold characters produced by superimposing characters.

Superimposed characters will be produced as follows:

When character keys representative of "A", "B", "C" are depressed, letters "A", "B", "C" are written on the sheet as indicated by 246, 248, 250, respectively in FIG. 24. Then, the back space key 36 is depressed three times to return the pen to the first letter position. The forward key 38 is depressed once while depressing the code key 54, and then the character keys for "A", "B", "C" are depressed to print letters "A", "B", "C" as indicated by 252, 254, 256, respectively, which are shifted ph (=PH×½) from the letters "A", "B", "C" indicated by 246, 248, 250. Superimposed letters "A", "B", "C" in FIG. 25 can be written by depressing the index key 50 once, rather than the forward key 38, while depressing the code key 54. Superimposed letters "A", "B", "C" in FIG. 26 can be written by depressing the forward key 38 and the index key 50, rather than the forward key 38 singly, while depressing the code key 54. Superimposed characters other than illustrated can freely be produced, and can be shifted from each other by a distance which can freely be changed by depressing the key or keys different times while depressing the code key 54. The superimposed characters are effective in producing bold characters or printing intentionally shifted characters. Characters written in the first recording cycle and those in the second recording cycle can easily be recorded in different colors.

Figure 27:
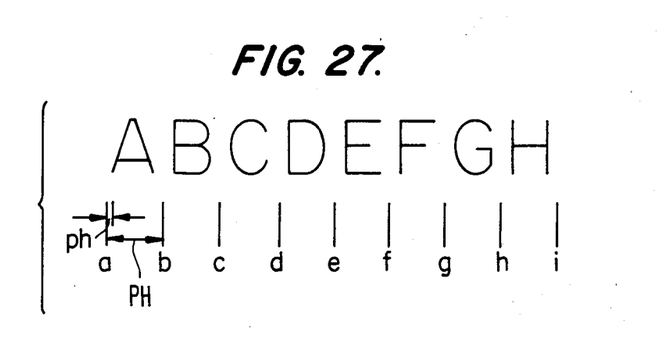
FIG. 27 is a diagram illustrative of a position capable of setting a margin and a tabulator stop.

When the recording pen is positioned at the starting end of a normal pitch PH as shown in FIGS. 15 through 19, "DIRECT PRINTING MODE" is displayed on the display 16. When the recording pens are positioned off the starting end, "OVERLAY PRINTING MODE" is displayed to indicate that any characters recorded in this mode will be superimposed on themselves. Neither margin nor tabulator stop can be set as long as the recording pen is not positioned at the starting end of each pitch or in the write starting position. Therefore, tabulator stops and margins can only be set at points a through i in FIG. 27. This makes it unnecessary for the memory in the microcomputer 114 to store the numbers of the second smaller pitches ph, pv, and hence the memory may be of a smaller capacity and is economically advantageous.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention. For example, said recording pen may be replaced by other simillar means such as a thermal head.

What is claimed is:

1. A pen recorder comprising:
   (a) recording means having a recording pen, first moving means for moving said recording pen in an X-axis direction, a sheet of recording paper, and second moving means for moving the sheet in a Y-axis direction;
   (b) control means for controlling said recording means;
   (c) a keyboard for applying operation commands to said control means;
   (d) first size selecting means for changing the horizontal size of characters to be recorded;
   (e) second size selecting means for changing the vertical size of characters to be recorded; and
   (f) said control means being responsive to selection made by said first size selecting means for controlling the interval of movement of said recording pen moved by said first moving means and also responsive to selection made by said second size selecting means for controlling the interval of movement of the sheet moved by said second moving means;
   wherein said first size selecting means includes a switch for setting a horizontal magnification of characters to be recorded, and said second size selecting means includes a switch for setting a vertical magnification of characters to be recorded;
   and wherein said control means is responsive to a depression of a character key on said keyboard for reading X and Y coordinate data of a character represented by the depressed character key, reading vertical and horizontal magnifications set for the character, multiplying said coordinate data by said magnifications to provide final character coordinate data, and controlling said recording means to record the character based on said final character coordinate data.

2. A pen recorder comprising:
   (a) recording means having a recording pen, first moving means for moving said recording pen in an X-axis direction, a sheet of recording paper, and second moving means for moving the sheet in a Y-axis direction;
   (b) size selecting means for changing at least a horizontal size of characters to be recorded;
   (c) a keyboard having a right margin setting key for determining a recording range; and
   (d) control means for processing inputs from said keyboard, controlling said recording means, and issuing an alarm when the recording pen reaches a position a predetermined number of characters prior to a preset right margin;
   wherein said control means changes said alarm position in accordance with the size of characters selected by said size selecting means in such manner that a number of characters in an area between said alarm position and right margin is kept at a predetermined constant number regardless of the size of characters selected by said size selecting means and also
   wherein said control means issues the alarm when the pen reaches a position which meets the following relationship:

$0 \leq$ (preset right margin + horizontal character magnification) − (present pen position + horizontal character magnification × prescribed number of characters) < horizontal character magnification.

* * * * *